(No Model.)

C. F. WINKLER.
SECONDARY BATTERY.

No. 471,590. Patented Mar. 29, 1892.

WITNESSES:

INVENTOR
Charles F. Winkler.
BY
ATTORNEY.

UNITED STATES PATENT OFFICE.

CHARLES F. WINKLER, OF TROY, NEW YORK.

SECONDARY BATTERY.

SPECIFICATION forming part of Letters Patent No. 471,590, dated March 29, 1892.

Application filed November 8, 1890. Serial No. 370,780. (No model.)

*To all whom it may concern:*

Be it known that I, CHARLES F. WINKLER, a citizen of the United States, residing in Troy, county of Rensselaer, and State of New York, have invented certain new and useful Improvements in Secondary Batteries, of which the following is a specification.

This invention has reference to secondary batteries, the object being to improve the mechanical construction with a view to enhancing the efficiency of the battery.

The novelty principally resides in the form of the plate, which consists, generally speaking, of a series of lead troughs placed one above the other and containing the active material, the troughs being so located with respect to each other that there will be a free space for the circulation or penetration of the acid solution.

The invention involves also a method of applying the active material to the plates or electrodes.

The invention comprehends a gelatinous acid solution, the object of which is to make the battery as dry as possible to facilitate transportation and therefore well adapted for the propulsion of vehicles.

Figure 1:
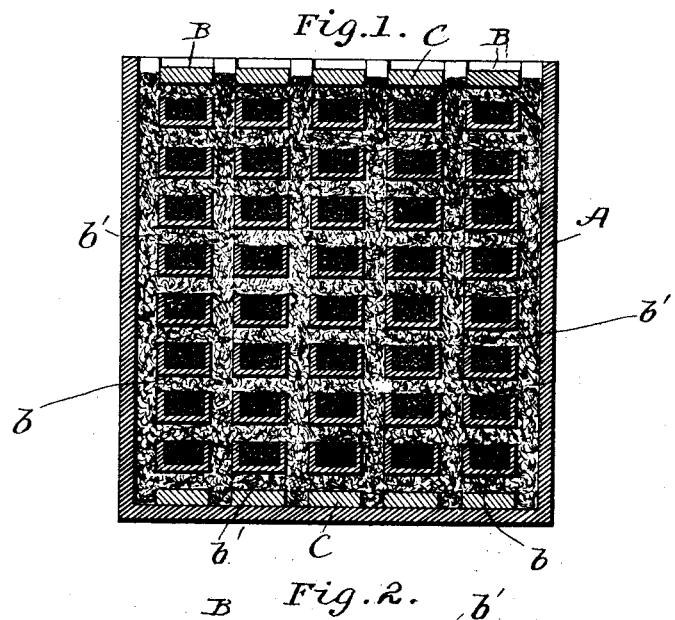
Figure 2:
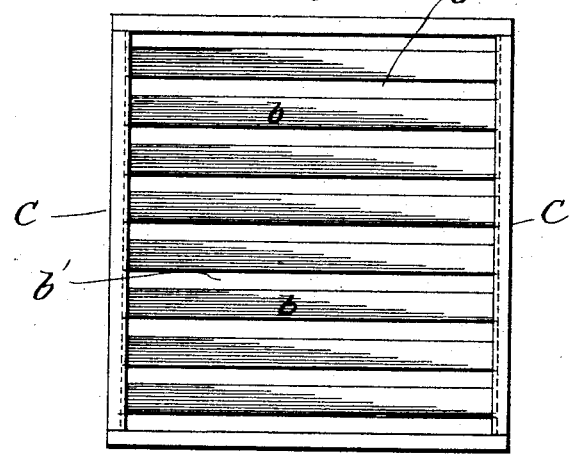
Figure 3:
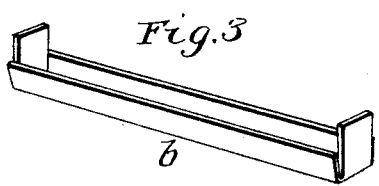

Referring to the accompanying drawings, Figure 1 represents a sectional view through a cell of my improved battery. Fig. 2 represents a side view of one of the plates. Fig. 3 one of the troughs of which the plate is built up.

Referring to the drawings by letter, A represents the cell or jar containing the acid solution and the electrodes. Two of the walls of the cell opposite to each other are provided with vertical grooves which receive the edges of the plates and maintain the same in a fixed relation with each other when in the cell. The plates B consist of a series of lead troughs $b$, placed one above the other and supported at their ends by a suitable frame C, preferably of insulating material, such as wood. These troughs are of a general rectangular shape, although I do not confine myself to that shape, as good results may be obtained by using a V-shaped trough or a semi-circular trough. The troughs, however, are to be set in the frame C in such a manner that there shall be a free space $b'$ between the top edges and the bottom of every pair of troughs. This space is left in order to facilitate the circulation of the solution and also to expose a greater surface of the active material contained within the troughs to the action of the solution. When the body of the plate is divided up in this manner by the free openings, through which the solution may circulate, the action upon the plate is even throughout its entire body. In order to still further increase this working surface, I may perforate the bottom and sides of the troughs with small holes, which will permit the entrance of the liquid without allowing the active material to escape.

I do not confine myself to any particular method of manufacturing these plates. In the form shown, however, the method consists in making the troughs separate and forming laps at the ends, which are soldered together, thus forming a continuous structure. This, however, would not be sufficiently rigid to maintain its position and shape in the cell, and I therefore reinforce it by surrounding the four edges with a frame C of insulating material. This simply consists of four strips, preferably of wood, containing grooves on their inner faces, in which the connected edges of the troughs set. I may, however, cast all of the troughs together in a single casting, in which case the sides of the troughs would be cast in the same plane with the bottoms and afterward bent up at right angles thereto.

When the plate is completed, I insert the active material in the following manner: I first dip the plate into some caustic solution to thoroughly clean it. Then I prepare my active material, consisting of an oxide of lead, preferably the red oxide of lead, for the positive plate and of litharge for the negative plate, by mixing the same with water to such a consistency that it will easily flow. Then I take my plate and dip it vertically into this solution, which operation fills all the troughs. The plate is then set aside until the active material held in suspension settles to the bottom, when the free water is poured off, leaving a layer of the active material in the bottom of the troughs. This operation is repeated as many times as is necessary to fill or nearly fill the troughs. After standing a short time the active material becomes dry and hard.

In order to render my battery easily portable and to prevent its contents from spilling when subjected to shocks or rough usage, I propose to gelatinize my solution to a greater or less extent, in accordance with the conditions under which it is to be used. This I accomplish by mixing with the solution of sulphuric acid a certain quantity of silicate of soda. For general purposes the best proportion of these materials is about three parts of the acid solution to one part of the silicate of soda when the former is reduced to a specific gravity of 1.250 and the latter 1.180. These two are mixed together and then put into the cells containing the electrodes or plates. The substance remains in its liquid form for several hours after combination, so that it permeates all of the interstices of the cells and plates. In the course of a few hours the solution congeals or gelatinizes. When it reaches this condition, it not only prevents spilling of the solution, but serves the purpose of sealing the active material within the troughs and preventing it from becoming loosened and dropping out. The active material is not liable to drop out of the troughs in a plate such as I have described, but the acid solution when in the form of jelly will be useful as a binding agent in other forms of battery wherein the active material is held in pockets or otherwise secured to the face of the plates. I therefore do not limit myself to the use of the jelly in this particular battery. The proportions used in the jelly solution herein given are those which will be found best adapted for general purposes; but it may be found necessary under some conditions to make the jelly in a more fluid or a stiffer state. This is accomplished by varying the proportion of the two ingredients.

It will be observed that under some conditions the troughs in the plate herein described might have a tendency to sag or break down in the middle. I therefore propose to insert blocks of lead or any other material between the plates in a vertical row through the center to give additional strength to the plate.

It may be found in practice that the silicate of soda will slightly increase the resistance of the battery. In fact, my experiments have demonstrated this; but I overcome this evil result by the use of a limited quantity of a nox-oxidizable sulphate—such, for instance, as the sulphate of ammonia—which will be found to augment considerably the charge and discharge of the battery. Where these non-oxidizable sulphates have been used heretofore, the result has been that the active material has been torn or forced out of its seat in the electrode; but in the form of battery here described, where the jelly is used in combination with the troughs, this action is prevented entirely.

Having thus described my invention, I claim—

1. In a secondary battery, the combination, with plates containing active material and an acid solution in the form of a jelly serving to hold the active material in place, of a non-oxidizable sulphate, such as the sulphate of ammonia, contained in the solution, for the purpose set forth.

2. The method of applying the active material to secondary battery-plates herein described, consisting in first mixing the active material with a liquid in such proportion that the mixture will be in a liquid state, then dipping the plates into the liquid and thereby filling the pockets or chambers in the plates, then allowing the plates to stand until the active material settles in the pockets, then pouring off the free liquid, and repeating this operation until the pockets are filled.

In witness whereof I have hereunto signed my name in the presence of two subscribing witnesses.

CHAS. F. WINKLER.

Witnesses:
FRANK S. OBER,
EDWARD A. WAGNER.